United States Patent
Buchner et al.

(10) Patent No.: US 11,964,318 B2
(45) Date of Patent: Apr. 23, 2024

(54) METHOD FOR CONFIGURING A WORKPIECE-RELATED WORKPIECE HOLDING DEVICE FOR PRESS AUTOMATION

(71) Applicant: Bayerische Motoren Werke Aktiengesellschaft, Munich (DE)

(72) Inventors: Franz Buchner, Kronwieden (DE); Franz Heilmeier, Aham (DE); Franz-Xaver Hoehenberger, Obertunding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 280 days.

(21) Appl. No.: 17/432,389

(22) PCT Filed: May 7, 2020

(86) PCT No.: PCT/EP2020/062722
§ 371 (c)(1),
(2) Date: Aug. 19, 2021

(87) PCT Pub. No.: WO2020/233998
PCT Pub. Date: Nov. 26, 2020

(65) Prior Publication Data
US 2022/0184686 A1    Jun. 16, 2022

(30) Foreign Application Priority Data
May 23, 2019   (DE) .................... 10 2019 113 764.0

(51) Int. Cl.
*B21D 43/05* (2006.01)
*B21D 43/18* (2006.01)
(Continued)

(52) U.S. Cl.
CPC ........... *B21D 43/057* (2013.01); *B21D 43/18* (2013.01); *B25J 15/0061* (2013.01); *B25J 19/007* (2013.01)

(58) Field of Classification Search
CPC ..... B25J 15/0061; B25J 19/007; B21D 43/18; B21D 43/057
See application file for complete search history.

(56) References Cited

U.S. PATENT DOCUMENTS

| | | |
|---|---|---|
| 10,011,022 B1 | 7/2018 | Lin et al. |
| 2006/0123871 A1 | 6/2006 | Reissenweber et al. |

(Continued)

FOREIGN PATENT DOCUMENTS

| | | |
|---|---|---|
| CA | 2 835 896 A1 | 6/2014 |
| CN | 101909828 A | 12/2010 |

(Continued)

OTHER PUBLICATIONS

English translation of Chinese-language Office Action issued in Chinese Application No. 202080023419.2 dated Dec. 30, 2022 (nine (9) pages).

(Continued)

*Primary Examiner* — Moshe Wilensky
(74) *Attorney, Agent, or Firm* — Crowell & Moring LLP

(57) ABSTRACT

A method configures a workpiece-related workpiece holding device for press automation. At least one workpiece-specific holding element of the workpiece holding device is configurably secured to a support of the workpiece holding device in at least one degree of configuration freedom. The method has the steps of (a) imaging a real image of the at least one workpiece-specific holding element on a display device and (b) outputting configuration information relating to the at least one workpiece-specific holding element on the display device, the configuration information including at least one (Continued)

piece of reference information relating to a relative reference orientation and/or a relative reference position of at least one region of a workpiece-specific holding element relative to the support.

10 Claims, 4 Drawing Sheets

(51) Int. Cl.
    *B25J 15/00*     (2006.01)
    *B25J 19/00*     (2006.01)

(56) References Cited

U.S. PATENT DOCUMENTS

| | | |
|---|---|---|
| 2009/0322671 A1 | 12/2009 | Scott et al. |
| 2010/0274390 A1 | 10/2010 | Walser et al. |
| 2013/0193703 A1 | 8/2013 | Ando et al. |
| 2014/0170935 A1 | 6/2014 | Maurer |
| 2016/0288194 A1 | 10/2016 | Buchner et al. |
| 2017/0334075 A1 | 11/2017 | Eidelberg et al. |
| 2018/0354130 A1 | 12/2018 | Preisinger et al. |
| 2022/0347735 A1* | 11/2022 | Woidasky ............... F16P 3/00 |

FOREIGN PATENT DOCUMENTS

| | | |
|---|---|---|
| CN | 103227129 A | 7/2013 |
| CN | 103869750 A | 6/2014 |
| CN | 108369406 A | 8/2018 |
| DE | 101 28 016 A1 | 12/2001 |
| DE | 10 2010 016 646 A1 | 11/2010 |
| DE | 10 2014 009 363 A1 | 12/2014 |
| DE | 10 2014 204 366 A1 | 9/2015 |
| EP | 2 380 709 A2 | 10/2011 |
| JP | 2011-70401 A | 4/2011 |
| JP | 2013-3693 A | 1/2013 |
| WO | WO 2004/108323 A1 | 12/2004 |
| WO | WO 2006/055770 A2 | 5/2006 |
| WO | WO 2013/033747 A1 | 3/2013 |
| WO | WO 2013/120462 A2 | 8/2013 |
| WO | WO 2016/069731 A1 | 5/2016 |

OTHER PUBLICATIONS

English translation of Chinese-language Office Action issued in Chinese Application No. 202080023419.2 dated May 5, 2023 (10 pages).

International Search Report (PCT/ISA/210) issued in PCT Application No. PCT/EP2020/062722 dated Aug. 7, 2020 with English translation (five (5) pages).

German-language Written Opinion (PCT/ISA/237) issued in PCT Application No. PCT/EP2020/062722 dated Aug. 7, 2020 (six (6) pages).

German-language Search Report issued in German Application No. 10 2019 113 764.0 dated Jan. 30, 2020 with partial English translation (10 pages).

* cited by examiner

METHOD FOR CONFIGURING A WORKPIECE-RELATED WORKPIECE HOLDING DEVICE FOR PRESS AUTOMATION

BACKGROUND AND SUMMARY OF THE INVENTION

The invention relates to a method for configuring a workpiece-related workpiece holding device for press automation.

Corresponding methods for configuring a workpiece-related workpiece holding device for press automation are fundamentally known from the prior art. Known workpiece holding devices for press automation have a base element or a base member to which holding elements can be attached, wherein the holding elements serve for temporarily holding a workpiece, for example a sheet-metal part, also referred to as blank, which is supported by the workpiece holding device and which is to be pressed, or has been pressed, by means of a press apparatus. Here, the workpiece holding device is used for the, in particular automated or robot-assisted, loading of the press apparatus with the workpiece and for the removal of the pressed workpiece from the press apparatus.

The invention is based on the object of providing a method which allows the configuration of the workpiece-related workpiece holding device for a defined workpiece in particular with regard to a simple, quick and inexpensive measure. Here, it is the intention in particular that exact adaptation of the workpiece-specific holding elements to a workpiece be practicable in a simple and convenient manner.

The object is achieved by means of a method for configuring a workpiece-related workpiece holding device for press automation according to the independent claim. The claims dependent thereon relate to possible embodiments of the method.

The invention relates to a method for configuring a workpiece-related workpiece holding device for press automation, wherein at least one workpiece-specific holding element of the workpiece holding device is fastened, in a manner configurable in at least one degree of configuration freedom, to a support of the workpiece holding device. The method is characterized by the following method steps: (a) depiction of a real image of at least one workpiece-specific holding element on a display device, and (b) outputting of a configuration information item, which relates to the at least one workpiece-specific holding element, on the display device, wherein the configuration information item comprises at least one setpoint information item regarding a relative setpoint orientation and/or regarding a relative setpoint position of at least one region of a workpiece-specific holding element with respect to the support. In a further method step, it may optionally be provided that the configuration or the adaptation of the workpiece-specific holding element for or to a workpiece is performed on the basis of a configuration information item. Typically, the adaptation of the workpiece-specific holding element is performed by manual intervention of a technician or of a production worker who can, for example on a support fixed to an assembly table by means of a holder, fasten or assemble at least one, preferably multiple, workpiece-specific holding element(s). The fastening or the assembly is performed here such that the workpiece-specific holding element has a defined position and/or orientation relative to the support and thus possibly relative to further workpiece-specific holding elements that are fastened or to be fastened to the support. In order to implement such a configuration, the support and/or the at least one workpiece-specific holding element, and/or connector and/or connecting points arranged or formed between the support and the holding element, have/has for example a clamping mechanism which makes it possible for the workpiece-specific holding element to be fixed in a desired position and/or orientation and thus in a desired configuration relative to the support and/or relative to at least one holding element which is to be fastened or is fastened to the support.

A degree of configuration freedom may comprise at least one variation of a, preferably a variation of multiple, translational and/or rotational degree(s) of freedom of at least one holding element relative to a support bearing the holding element.

A setpoint information item, in particular a relative setpoint position and/or a relative setpoint orientation of at least one holding element with respect to a further holding element and/or with respect to a support, may be ascertained at least partially, preferably exclusively, from a CAD dataset for a workpiece that is to be gripped by means of the workpiece holding device. The consideration of the CAD data for generating the setpoint information item may preferably be performed in automated fashion. Here, the CAD data may comprise geometry information items both relating to the workpiece and relating to the support and/or the holding element.

A workpiece-specific holding element is to be understood to mean a holding element which is adaptable to the shape and/or contour of a workpiece, or the orientation and/or position of which at least relative to a support bearing the workpiece-specific holding element are/is variable and in particular fixable in terms of the variation. For this purpose, the holding element may be connected via at least one connector and/or one connecting point to the support. The workpiece-related workpiece holding device is to be adapted to workpieces of different form through variation of the orientation and/or position of the at least one workpiece-specific holding element.

The workpiece-related workpiece holding device is used for the preferably automated handling, that is to say for the automated loading and for the automated removal, of workpieces into and from a press apparatus. Here, the workpiece holding device may be used as a connecting member between a robot or a manipulator and a workpiece. In the press apparatus, the inserted workpiece can be subjected to a deformation process, in particular a deep-drawing process. After the workpiece has been subjected to the deformation process, the removal of the workpiece can be performed by virtue of the deformed workpiece being temporarily held by the workpiece-related workpiece holding device. Here, the workpiece-related workpiece holding device may be designed as a gripping means or as a holding means of a robot and/or of a manipulator and, after the deformed workpiece has been gripped by or connected to the workpiece holding device, the workpiece-related workpiece holding device can be safely and reliably removed from the press apparatus and moved to an intended location, possibly to a material carrier. Having arrived at the intended location, the connection to the workpiece holding device can be released, and the workpiece holding device can be used for gripping a further workpiece.

The deformation process may for example comprise multiple deformation steps which are each performed on a separate deformation tool. For this purpose, multiple workpiece-related workpiece holding devices may be used, wherein each workpiece-related workpiece holding device is adapted to the shape of the deformed workpiece that is to be removed from the respective deformation tool.

The workpiece may preferably be a sheet-metal part which is fed as a blank to a deformation tool. Here, the workpiece may have a size which amounts to at least one meter in maximum longitudinal extent, preferably at least 1.5 m in maximum longitudinal extent, particularly preferably at least 2.0 m in maximum longitudinal extent. In order to handle correspondingly large workpieces, it is necessary to use workpiece-related workpiece holding devices which are of substantially similar dimensions. Here, the individual workpiece-specific holding elements fastened to a common support may have substantially similar spacings to one another, such that the adaptation thereof, or the comparison of the position and/or orientation of the holding elements with respect to one another, gives rise to difficulties because, owing to the normal field of view of a production worker, this is difficult to grasp for a manual configuration or a manual adaptation.

In relation to an automated adaptation or configuration of the workpiece-specific holding elements, the advantage of the manual adaptation lies in the fact that the outlay is lower because, in particular, the investment in a corresponding industrial robot that performs the adaptation of the holding elements, and the workpiece-specific programming thereof, are eliminated. In particular, the fact that the workpiece-related workpiece holding device requires an adaptation for a workpiece, and thus the adaptation generally only has to be performed once per workpiece, is not in proportion with the effort involved in programming an industrial robot to perform the display and/or adaptation of a configuration of a workpiece-related workpiece holding device, and can be performed more cost-effectively by manual assembly carried out by a production worker.

The workpiece-specific holding elements of the workpiece-related workpiece holding device may for example comprise suction means, for example suction cups, which allow the workpiece to be held on the workpiece holding device by application of a negative pressure, in particular of a vacuum. For this purpose, the suction means can be mounted on a preferably planar and areal section of the workpiece, and a negative pressure can be built up. Alternatively or in addition, at least one workpiece-specific holding element may be in the form of a holding element that forms a positively locking connection. For this purpose, the holding element may, for example by means of a gripping element, engage around and/or under the workpiece and hold the latter. Alternatively or in addition, at least one holding element of the workpiece-related workpiece holding device may form a temporary connection to the workpiece by means of a non-positively locking connection.

The in particular manual execution of the configuration or of the manipulation of the at least one workpiece-specific holding element is assisted in that a real image of the at least one workpiece-specific holding element is depicted on a display device for a production worker, wherein a configuration information item relating to the workpiece-specific holding element is additionally output on the display device. The configuration information item comprises at least one setpoint information item regarding a relative setpoint orientation and/or regarding a relative setpoint position of at least one region of a workpiece-specific holding element with respect to the support. The setpoint information item may for example merely provide a statement as regards whether the holding element is situated in a predefined position and/or orientation or in a target position and/or target orientation relative to the support, that is to say display an "OK" or "not OK" information item. Alternatively or in addition, the setpoint information item may show a setpoint position and/or setpoint orientation through the display or through the outputting of two-dimensionally or three-dimensionally shown elements on the display device. The setpoint information item thus provides the production worker with an aid for the manipulation or for the adaptation of the at least one workpiece-specific holding element relative to a further workpiece-specific holding element and/or relative to a support holding the workpiece-specific holding element.

In one preferred embodiment, the setpoint information item is shown in a superimposed manner on the real image, which is likewise depicted or displayed on the display device, of the holding element, preferably of the holding element and simultaneously at least sections of the support. Such a depiction on the display device may be implemented for example in the manner of so-called "augmented reality" or in the form of a computer-based augmentation of the visual perception of reality. Here, a setpoint information item may be jointly depicted visually, in particular in a superimposed manner, on a real image of the holding element that is depicted or shown on the display device. It is preferable if punctiform, linear and/or areal elements are jointly displayed as setpoint information items in the display device showing the real image at least of the holding element. By way of the superimposed depiction, the production worker can easily and conveniently identify and/or derive a preferred or necessary handling action demanded of them in the present situation. For example, a production worker can identify how they have to manipulate the fastening of a holding element in order to attain a targeted setpoint position and/or setpoint orientation.

It is possible that the method provides acquisition at least of the at least one workpiece-specific holding element by means of an acquisition device which is in particular arranged in part in a spatially fixed manner relative to a holder, wherein the acquisition device is used to generate at least one actual information item at least relating to the workpiece-specific holding element, which at least one actual information item in particular comprises a relative actual orientation and/or actual position of the at least one workpiece-specific holding element with respect to the support, and the actual information item is taken into consideration in the configuration information item, or the actual information item forms at least a constituent part of the configuration information item. The acquisition device is preferably configured to at least optically acquire an object, in this case at least one holding element. The information items acquired by the acquisition device may be processed in particular inter alia to form actual information items, allowing a statement to be made regarding the position and/or orientation of the holding element relative to at least one further holding element and/or relative to a support for holding the holding element. Here, the acquired actual information items may be prepared and/or subjected to predefined processing, and it is thus possible, for example through the use of filters, for the ascertained information item to be reduced, such that only "key points" essential for the configuration, or a reduced image information item, are/is transmitted as actual information to the display device and displayed there.

In one preferred embodiment, the method provides a comparison of an actual information item, which relates to a relative actual orientation and/or actual position of at least one region of the workpiece-specific holding element with respect to the support, with the setpoint information item. It is additionally optionally the case that, in a further method step, the generation of a comparison information item, which relates to a deviation and/or a correspondence of the comparison, is provided. Here, the display of the configuration information item on the display device preferably takes into consideration the comparison information item. By virtue of a comparison operation being performed by means of, for example, an evaluation device, it can be achieved that a configuration or an adaptation of the at least one workpiece-specific holding element is made easier for the production worker, because the intellectual effort demanded of them, in particular the spatial visualization capability demanded of them, is reduced. The actual information item may be based at least partially on information items acquired by an acquisition device. Alternatively or in addition, it may be provided that the actual information item is taken into consideration in an evaluation device, for the selection and/or for the ascertainment of an actual information item, by manual intervention of a production worker and/or other input means.

The display of a comparison information item relating to correspondence of the comparison may be performed for example by means of a first predefined symbol on the display device, and/or the display of a comparison information item relating to deviation of the comparison may be performed by means of a second symbol, which differs from the first symbol, on the display device, wherein the first and the second symbol differ in terms of their color and/or shape and/or structure. By virtue of the fact that respective different symbols are selectively displayed to the production worker, it is made possible that, in a manner dependent on the displayed symbol, it is displayed to the production worker in an easily and visually comprehensible manner whether or not for example a target position and/or target orientation of the workpiece-specific holding element is present. The different color of the at least two symbols may be configured to differ for example in the brightness thereof and/or in the color temperature thereof and/or in the color thereof. Alternatively or in addition, the at least two symbols may be configured to differ in terms of their shape (for example polygonal, circular, oval). Alternatively or in addition, the at least two symbols may differ in terms of their structure, that is to say for example in terms of their fill type or extent (for example checkered, lined, type of areal pattern).

In one particularly preferred embodiment, it is provided that a configuration information item is displayed on the display device such that, as the workpiece-specific holding element approaches its setpoint position and/or setpoint orientation, at least one section of the display device changes color, wherein a defined color coding is realized for the depiction of a predefined spacing or a predefined spacing range of the workpiece-specific holding element with respect to its setpoint position and/or setpoint orientation. For example, a first spacing range may be represented in a first color, and a second spacing range, which differs from the first spacing range, may be represented in a second color. Finally, it is for example possible for at least one third spacing range, which differs from the first and the second spacing range, to be distinguished through the display of a third color that differs from the first two colors. It is thus achieved that, as a holding element approaches its setpoint position and/or setpoint orientation, the production worker can identify whether they are approaching or have reached the setpoint position and/or setpoint orientation, and in the process, they can, through the use of at least three spacing ranges and corresponding visual representation, estimate how far away from the target position the holding element still is. Here, as an alternative or in addition to a color distinction, use may also be made of a difference in shape and/or structure of the symbol. The acquisition or the actual information item at least of the workpiece-specific holding element can be achieved through the real-time acquisition thereof.

It is furthermore optionally possible, in one method step, to provide an acquisition of the at least one workpiece-specific holding element by means of an acquisition device, which is in particular arranged in part in a spatially fixed manner relative to a holder, in order to generate a real image of the at least one workpiece-specific holding element, and depiction of the real image on the display device. It can thus be achieved that the real image on the display device can be subjected to preferably digitally implemented processing. For example, the contrast and/or recognizability of regions of the holding element and/or of the support which are of interest for the implementation of a configuration by the production worker may be optically or graphically highlighted. The acquisition device may for example be in the form of a camera. The acquisition device may also be configured to output a "live image" and thus perform a real-time acquisition, which is output by means of a display device in the form of a screen. The acquisition device may be operable or operated such that, on the display device, the displayed information is updated at least every two seconds, preferably at least every second, particularly preferably at least every half second. Such latency can be regarded as sufficient for the execution of the method according to the invention, wherein, here, the necessary processing power is in favorable proportion.

The display device may for example be configured as a portable electronic terminal or as an electronic mobile device. For example, as an electronic terminal, use may be made of a smart phone, a tablet computer and/or a portable computer (for example laptop). Alternatively, a fixedly installed screen may be used as a display device. To receive the configuration information item, the display device may be operatively connected in wired or wireless fashion to an evaluation device and/or to an acquisition device for unidirectional or bidirectional exchange of information.

In a further alternative or additional embodiment of the method, it is provided that the real image of the at least one workpiece-specific holding element is depicted on at least one transparent region of the display device. Here, the display device may be formed at least in certain sections as a transparent element. Here, the transparent element or the display device may be capable of being carried by a production worker in hands-free fashion. This may be implemented for example by virtue of the display device or the transparent element being formed as a constituent part of a pair of spectacles. By virtue of a production worker looking through the spectacle lens, a real image of the holding element and/or of the support can be depicted on the spectacle lens or on the transparent element. The configuration information item can be output, in particular displayed, in particular in superimposed fashion, onto the transparent element. It is thus made possible for the production worker, while looking through the spectacle lens, to additionally conveniently grasp at least one configuration information item. As an alternative to a pair of spectacles, the transparent element may also be formed as a transparent element which is installed fixedly on an assembly table, for example as a glass body. Also, the transparent element may be carried by a production worker using some other holding means; for example, the transparent element or the display device is integrated in a visor section of a helmet.

For example, an acquisition at least of the at least one workpiece-specific holding element may be performed by means of an acquisition device, which is in particular arranged in part in a spatially fixed manner relative to the holder, using at least two, preferably using at least three, particularly preferably using at least four, acquisition means which optically acquire the workpiece-specific holding element from different positions and/or orientations. The two, three or more acquisition means allow an exact localization of the actual position and/or actual orientation of the at least one holding element. By virtue of the fact that at least one acquisition means, in particular all acquisition means, has/have a defined and preferably spatially fixed position and/or orientation relative to the support or relative to a holder holding the support and/or relative to an assembly table indirectly or directly holding the support, exact relative position information of the support with respect to the at least one holding element can be obtained. Here, accuracy values with a tolerance of less than 5 mm, preferably of less than 3 mm, particularly preferably of less than 2 mm, can be achieved. This is advantageous in particular if the support has a maximum longitudinal extent of at least 1 m, preferably of at least 1.5 m and particularly preferably of at least 2.0 m. At least one acquisition means may serve additionally or exclusively for providing a real image of the holding element and/or of the support. Here, this acquisition means, which is for example in the form of a camera, may be arranged such that the image generated from its perspective serves as the basis or as the perspective for the display for a production worker. This may be helpful in order to provide the production worker with a depiction that makes it easier for them to reconcile what is situated in front of them and what is displayed to them on the display device. The possibly further acquisition means are arranged and oriented such that the most exact possible spatially determined image of the position and orientation of the at least one holding element is made possible. For example, the main acquisition lines of at least two optical acquisition means enclose an angle of 5° to 180°, preferably an angle of 20° to 165°, particularly preferably an angle of 40° to 95°.

As an additional function, it may be provided that the method provides an execution of a calibration step in which at least the deviation of at least one optical acquisition means of the acquisition device to a measurement standard received in the holder is ascertained, and in particular the measurement standard replicates the shape and/or orientation and/or contour of a support held on the holder and/or of a workpiece-specific holding element fastened to the holder and to a support. By means of such a calibration step, for example through the execution of a zero adjustment, the accuracy of the information items acquired by the acquisition means, and the configuration information items derived from the information items, is increased. A measurement standard may for example have a high-contrast checkerboard pattern. It may also be provided that the measurement standard is arranged or formed at least in certain sections on a holder and/or on an assembly table, such that a calibration process can be performed in a simple and convenient manner during repeated use.

It may prove to be advantageous if any deviation of at least one optical acquisition means ascertained in the calibration step is taken into consideration in a processing of the information items ascertained from the at least one optical acquisition means. Here, any inaccuracy of an acquisition means can be taken into consideration and/or compensated by virtue of an offset, which takes the deviation into consideration quantitatively or qualitatively, being taken into consideration in the processing of the data ascertained by means of the acquisition device.

By virtue of an additional information item, which relates to the workpiece-specific holding element, to the support and/or to the workpiece that is to be held during the intended use of the workpiece-specific holding element, of the configuration information item being displayed on the display device, the operating convenience for a production worker can be increased. In particular, the additional information item comprises a component number information item and/or a component weight information item and/or a component dimension information item and/or a manufacturer information item and/or a supplier information item and/or a manufacturing time information item and/or a delivery time information item and/or a tolerance information item and/or an aging information item of the workpiece-specific holding element, of the support and/or of the workpiece that is to be held during the intended use of the workpiece-specific holding element. Such additional information items can allow the production worker to conveniently follow up on and carry out plausibility checking ideas and steps during their configuration activities. For example, it is possible for the component number of the holding element that is presently to be configured to be displayed to the production worker.

It is particularly advantageous if at least one workpiece, which during the intended use of the workpiece-specific holding element is to be at least temporarily held by the latter, is displayed at least in sections in a visually perceptible manner as an additional information item of the configuration information item on the display device. Here, in particular, the additional information item may be displayed in a superimposed manner on the real image depicted on the display device and/or on the actual information item and/or on the setpoint information item of the at least one workpiece-specific holding element. By virtue of the fact that the workpiece that is to be held by the workpiece-related workpiece holding device during intended use is not present during the configuration of the workpiece holding device, or the handling of the workpiece would greatly complicate the configuration process, in particular owing to the mass and size of the workpiece which is in particular in the form of a deformed sheet-metal part, it is advantageous for the workpiece-specific information items to be displayed as a superimposed visually perceptible information item or configuration information item on the display device. Thus, the demands on the spatial visualization capability of the production worker are lowered, because a possibly perspective depiction on the display device can be depicted or is depicted in a superimposed manner on a real image of the holding element and/or of the support which is simultaneously depicted on the display device.

The additional information item may comprise static, that is to say invariant, information items relating to, for example, geometry, setpoint spacings and/or other static component information items at least of constituent parts of the workpiece holding device. Alternatively or in addition, at least one additional information item may be based on an acquisition information item, ascertained by means of the acquisition device, regarding the at least one workpiece-specific holding element, or an additional information item may be derived from or dependent on the acquisition information item. In particular, an identification of at least one workpiece-specific holding element is performed by means of the acquisition information item, wherein an identification information item can be displayed as an additional information item associated with the holding element. For example, it is displayed that a holding element is from a first manufacturer, and this can be derived for example from an analysis of the shape, acquired by means of the acquisition device, or of the acquired pattern, of the workpiece-specific holding element and/or through the acquisition of a marking (for example an optoelectronically readable script, for example a barcode), positioned on the acquired holding element.

In particular if the support has an extent which is large in relation to the field of view of a production worker, or if in each case one holding element is to be fastened to regions of the support which are relatively far apart from one another, it may be provided that, on the display device, a display is output which shows a subregion of the support in enlarged form in relation to a previous display, wherein the displayed subregion of the support corresponds to a fastening location of at least one workpiece-specific holding element. In other words, in automated fashion or by manual intervention, it is possible for a subregion to be depicted in a zoomed-in manner, or for an image segment to be depicted in enlarged form, such that an easier and more exact visualization of that region of the workpiece holding device which is of interest for at least one configuration sub-step can be at least temporarily displayed to the production worker. In particular, the enlargement of at least one subregion of the support on the display device is performed in accordance with a selection of the workpiece-specific holding element that is to be fastened to the subregion of the support. Such a selection may for example be performed by means of an automated and/or in particular previously manually initiated acquisition of a marking of the corresponding holding element and/or of a shape of the corresponding holding element.

Furthermore, it may for example be provided that the execution of a selection of at least one workpiece-specific holding element, which is to be fastened to the support, is performed by optical acquisition of the workpiece-specific holding element by means of an acquisition device and/or by means of a manual selection by way of an input device. After a selection of the holding element has been made, a zooming-in effect onto that subregion of the support at which the holding element provided for this is to be assembled or set can be implemented, preferably in automated fashion.

In addition to the method for configuring a workpiece-related workpiece holding device for press automation, the invention also relates to an apparatus for executing a method for configuring a workpiece-related workpiece holding device for press automation, comprising a display device and an acquisition device for acquisition of at least one workpiece-specific holding element of the workpiece holding device in order to generate at least one actual information item at least relating to the workpiece-specific holding element, which at least one actual information item in particular comprises a relative actual orientation and/or actual position of the at least one workpiece-specific holding element with respect to a support, wherein the actual information item is taken into consideration in a configuration information item and can be output on the display device. Furthermore, the invention also comprises a method for feeding a workpiece into an automated press, wherein, for the feed of the workpiece, use is made of a workpiece holding device comprising at least one support and at least one workpiece-specific holding element, which workpiece holding device has been configured in accordance with a method described herein.

All advantages, details, embodiments and/or features of the method according to the invention for configuring a workpiece-related workpiece holding device for press automation are transferable or applicable to the apparatus according to the invention and/or to the method according to the invention for feeding a workpiece into an automated press.

The invention will be discussed in more detail on the basis of exemplary embodiments in the drawings.

DETAILED DESCRIPTION OF THE DRAWINGS

Figure 1:
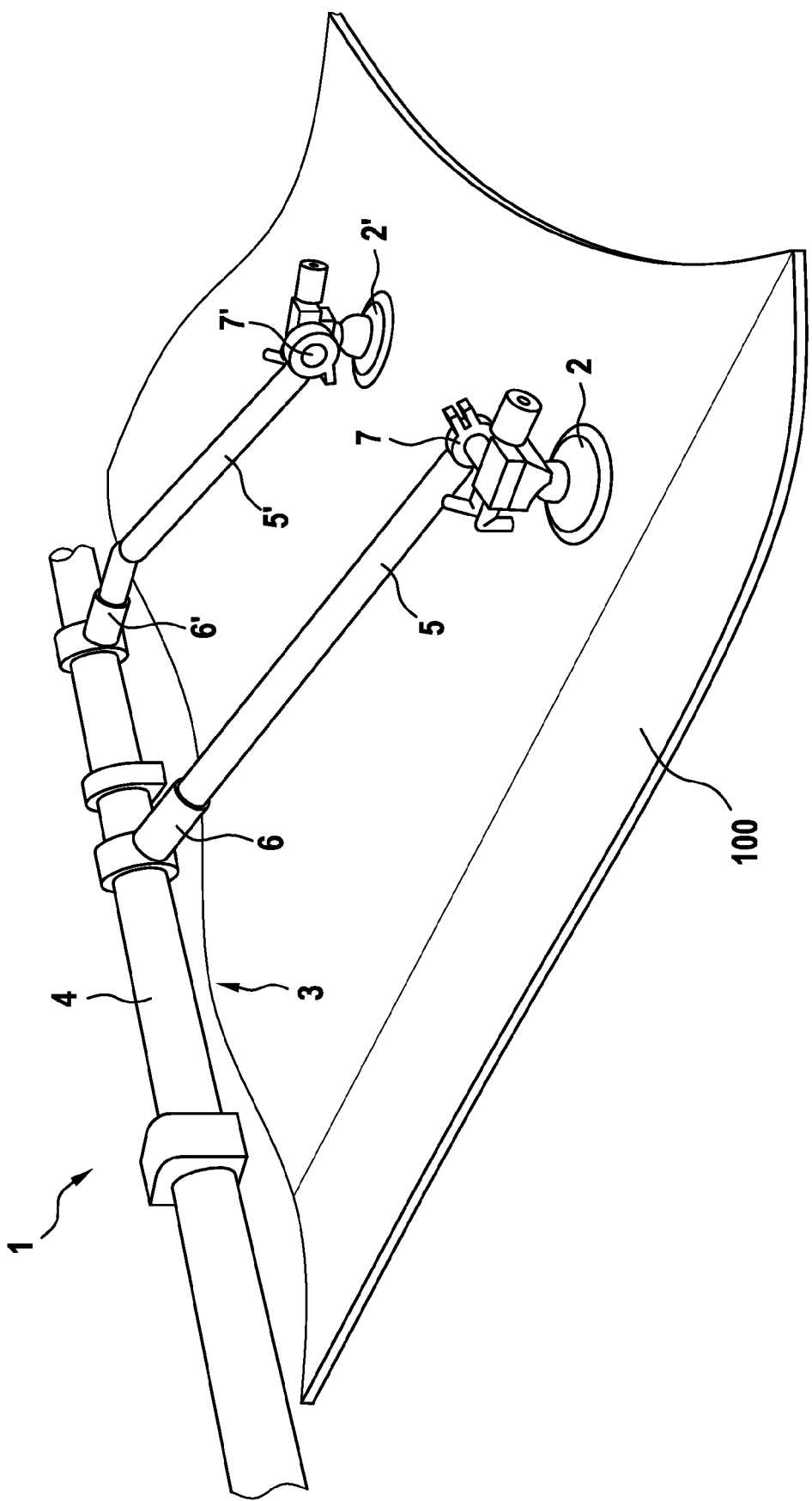
FIG. 1 is a diagrammatic illustration of a workpiece holding device with multiple workpiece-specific holding elements according to an exemplary embodiment.
Figure 2:
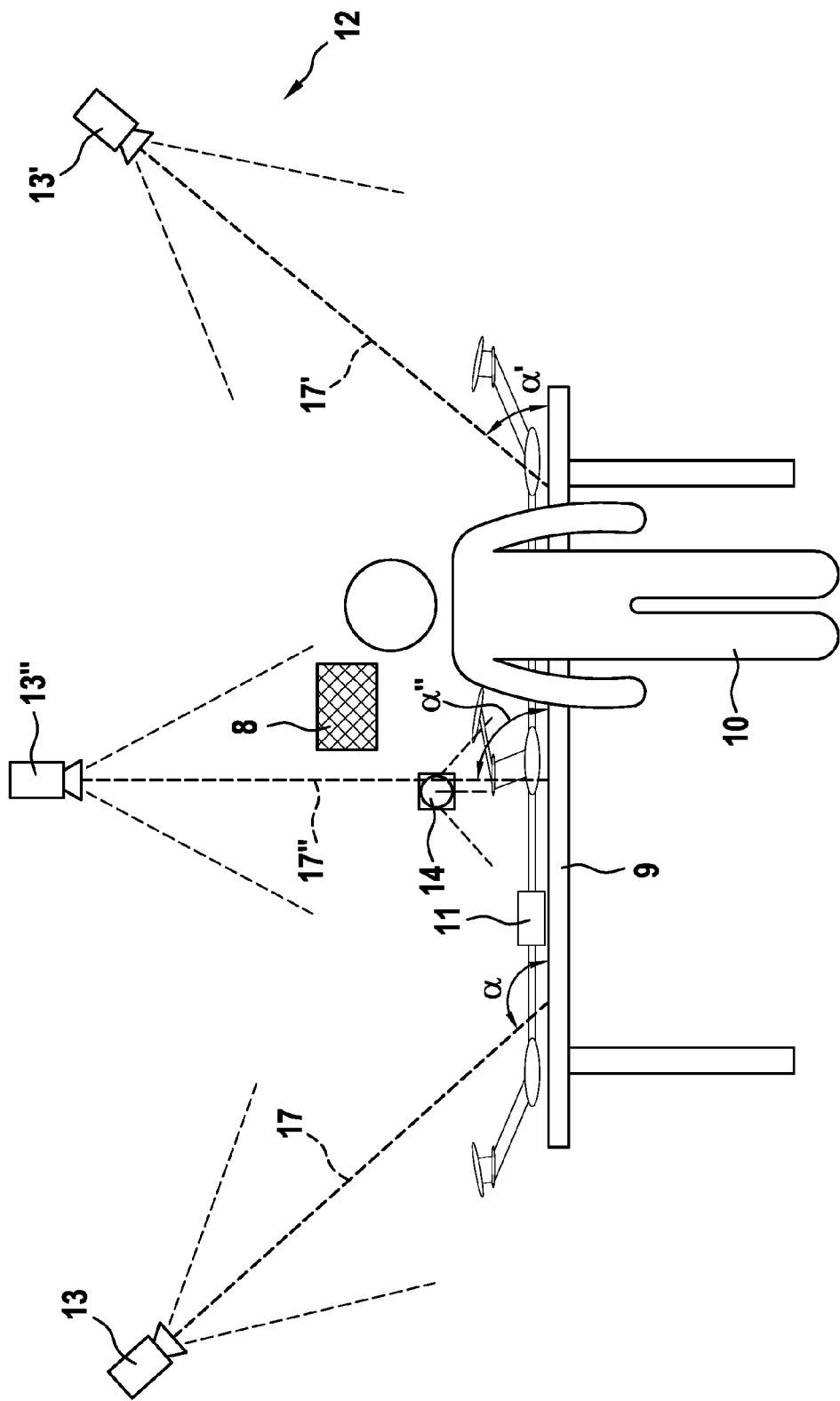
FIG. 2 is a diagrammatic illustration of a workstation for the execution of a method for manually configuring a workpiece-related workpiece holding device for press automation according to an exemplary embodiment.

FIG. 1 shows a workpiece-related workpiece holding device 1 for press automation, wherein multiple workpiece-specific holding elements 2, 2' of the workpiece holding device 1 are fastened, in a manner configurable in at least one degree of configuration freedom, to a support 3 of the workpiece holding device 1. The workpiece holding device 1 serves for temporarily gripping or for temporarily holding a workpiece 100. In the gripping state or in the holding state of the workpiece holding device 1, the workpiece 100 held by the workpiece holding device 1 can be moved, in particular removed from a deformation device (not illustrated), for example a press, and/or fed into a deformation device. The workpiece 100 may for example be fed in the form of a sheet-metal part or of a blank to the deformation device, subjected to a deformation process therein, and subsequently removed from the deformation device. The workpiece 100 may be a vehicle component, preferably a component of a motor vehicle, particularly preferably a body component of a motor vehicle. For the handling and the movement of the workpiece 100, the workpiece holding device 1 may be movably attached or fastened to a manipulator (not illustrated) or a robot apparatus (not illustrated).

The support 3 comprises a base, which is in particular in the form of an elongate tube section 4, to which the holding elements 2, 2' are fastened indirectly by connectors 5, 5'. Here, the connectors 5, 5' may be fixable in different positions and/or orientations with respect to the base means or the tube section 4, and/or the holding element 2, 2' may be fixable in different positions and/or orientations with respect to the connectors 5, 5', respectively. For this purpose, the connecting points 6, 6', 7, 7' may for example be formed as lockable joints. Preferably, the connecting points 6, 6', 7, 7' can be undone and/or locked, and thus a fixed position and/or orientation of a support 3 with respect to a connector 5, 5' and/or of a connector 5, 5' with respect to a holding element 2, 2' can be fixed and released, manually by a production worker 10, in particular without the use of tools. This means, for example, that a joint-like connecting point 6, 6', 7, 7' can be locked or released, that is to say transferred from a fixed state into a movable state and/or vice versa, by a production worker 10 using a wingnut or a quick release clamp.

Figure 4:
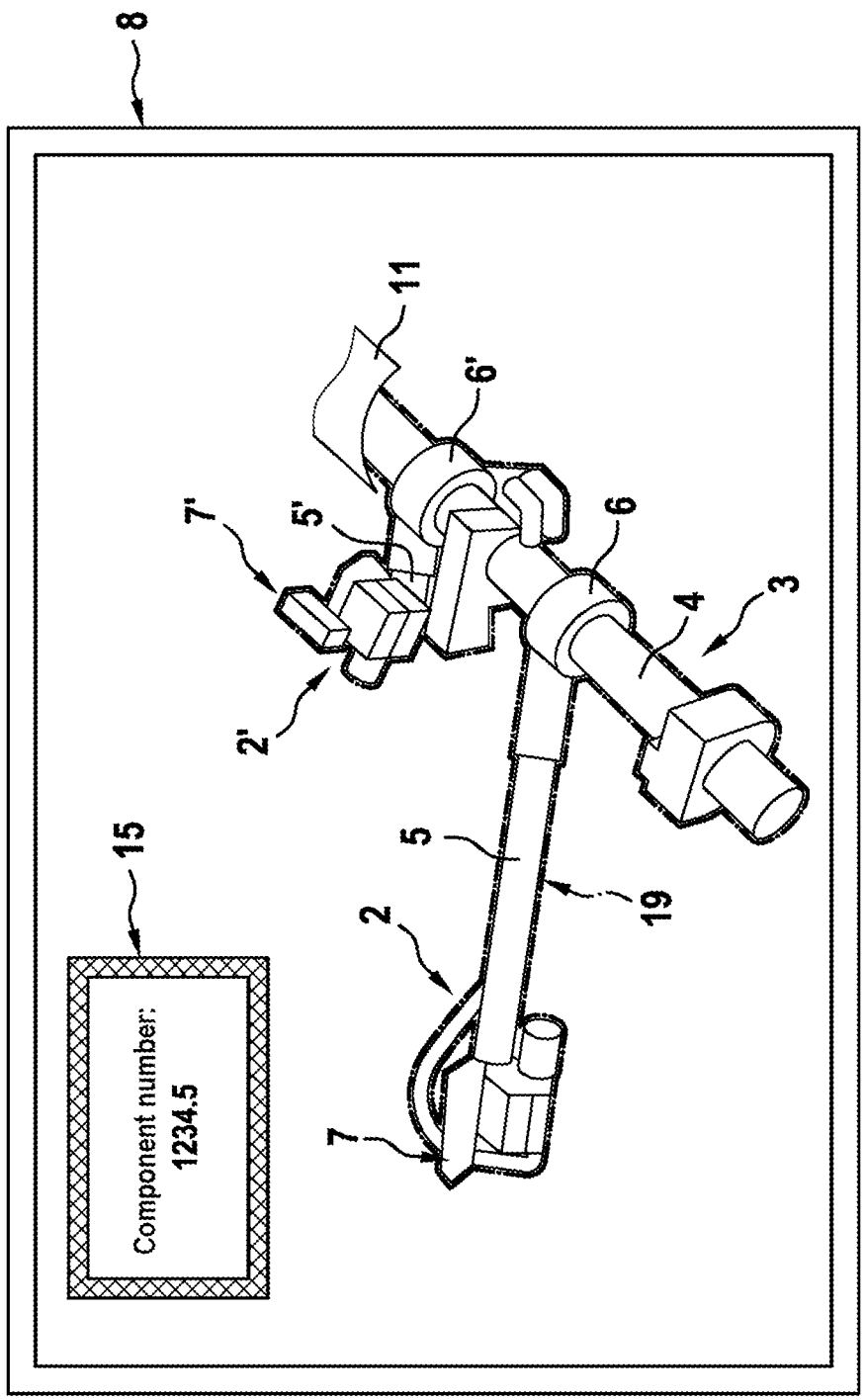
FIG. 4 is a diagrammatic illustration of an at least partial depiction of a workpiece holding device on a display device.

The method provides that a real image of at least one workpiece-specific holding element 2, 2' is output or depicted to the production worker 10 by means of a display device 8, cf. FIG. 4. In the embodiment illustrated, at least one section of the support 3, and additionally at least one holding element 2, 2', is displayed by means of the display device 8. In the embodiment discussed below and illustrated by way of example in the figures, the display device 8 is in the form of a screen arranged in the vicinity of, or on, an assembly table 9. Alternatively or in addition, the display device 8 may be in the form of a pair of smart spectacles (not illustrated) or a pair of augmented reality spectacles. Here, the real image of the at least one workpiece-specific holding element 2, 2' may be depicted on at least one transparent region (not illustrated) of the display device 8. In general, the display device 8 may be in the form of a head-mounted display (HMD), wherein the visual information may be projected by means of a screen, in particular close to the eye, or directly onto the retina of the person wearing the HMD.

To generate a real image of the at least one workpiece-specific holding element 2, 2', an acquisition of the at least one workpiece-specific holding element 2, 2' by means of an acquisition device 12, which is in particular arranged in part in a spatially fixed manner relative to a holder 11, in order to generate a real image of the at least one workpiece-specific holding element 2, 2', and a depiction of the real image on the display device 8, may be performed. It is thus possible, for example, for a real-time depiction at least of the holding element 2, 2' to be made possible by the acquisition thereof by means of the acquisition device 12 and by transmission of the acquired information to the display device 8. In particular, in addition to the holding element 2, 2', at least sections of the support 3 are additionally jointly acquired by means of the acquisition device 12 and in particular jointly output on the display device 8.

In addition to the real image, a configuration information item relating to the at least one workpiece-specific holding element 2, 2' is output on the display device 8, wherein the configuration information item comprises at least one setpoint information item relating to a relative setpoint orientation and/or relating to a relative setpoint position of at least one region of a workpiece-specific holding element 2, 2' with respect to the support 3. The setpoint information item may thus also comprise a relative setpoint position and/or setpoint orientation of the holding element 2, 2' with respect to the connector 5, 5' and/or a relative setpoint position and/or setpoint orientation of the connector 5, 5' with respect to the support 3.

By virtue of the fact that both the real image at least of the holding element 2, 2' and a configuration information item are output in a visually comprehensible manner to the production worker 10 by means of the display device 8, it is made possible or easier for the production worker 10 to implement a configuration of a workpiece holding device 1 for a specific workpiece 100.

A preferred method step comprises an acquisition at least of the at least one workpiece-specific holding element 2, 2' by means of an acquisition device 12, which is in particular arranged in part in a spatially fixed manner relative to a holder 11 arranged on an assembly table 9, in order to generate at least one actual information item at least relating to the workpiece-specific holding element 2, 2', which at least one actual information item in particular comprises a relative actual orientation and/or actual position of the at least one workpiece-specific holding element 2, 2' with respect to the support 3, wherein the actual information item is taken into consideration in the configuration information item. In the illustrated embodiment, the acquisition device 12 has 4 acquisition means 13, 13', 13'', 14, wherein the acquisition means 13, 13', 13'', 14 may for example be in the form of optical acquisition sensors or cameras. The acquisition means 13, 13', 13'', 14 may be arranged with a spacing of 0.5 to 2.0 meters, preferably with a spacing of 0.8 to 1.7 m, to an assembly table 9.

The acquisition at least of the at least one workpiece-specific holding element 2, 2' by means of an acquisition device 12, which is in particular in part arranged in a spatially fixed manner relative to the holder 11, may be performed using at least two, preferably using at least three, particularly preferably using at least four, acquisition means 13, 13', 13'', 14 which optically acquire at least one workpiece-specific holding element 2, 2' from different positions and/or orientations or perspectives. Here, a first group of acquisition means 13, 13', 13'', composed of at least one, preferably of two or more, acquisition means 13, 13', 13'', may serve for localizing or for acquiring the exact position and/or orientation at least of the at least one holding element 2, 2'. A second group composed of at least one acquisition means 14 may serve for the more suitable depiction or visualization of a real image of at least one holding element 2, 2' and/or for the more suitable visualization of the configuration information item, in particular of the setpoint information item, for at least one production worker 10. By virtue of the fact that the further acquisition means 14, which is assigned to the second group, primarily does not perform a position-determining function, the further acquisition means may be arranged or oriented such that the image generated by the acquisition means 14 assumes a perspective that allows a production worker 10 to easily grasp or spatially visualize the information items displayed by means of the display device 8, because the information items can be set in relation to, or depicted in superimposed fashion on, the image generated by the acquisition means 14.

Figure 3:
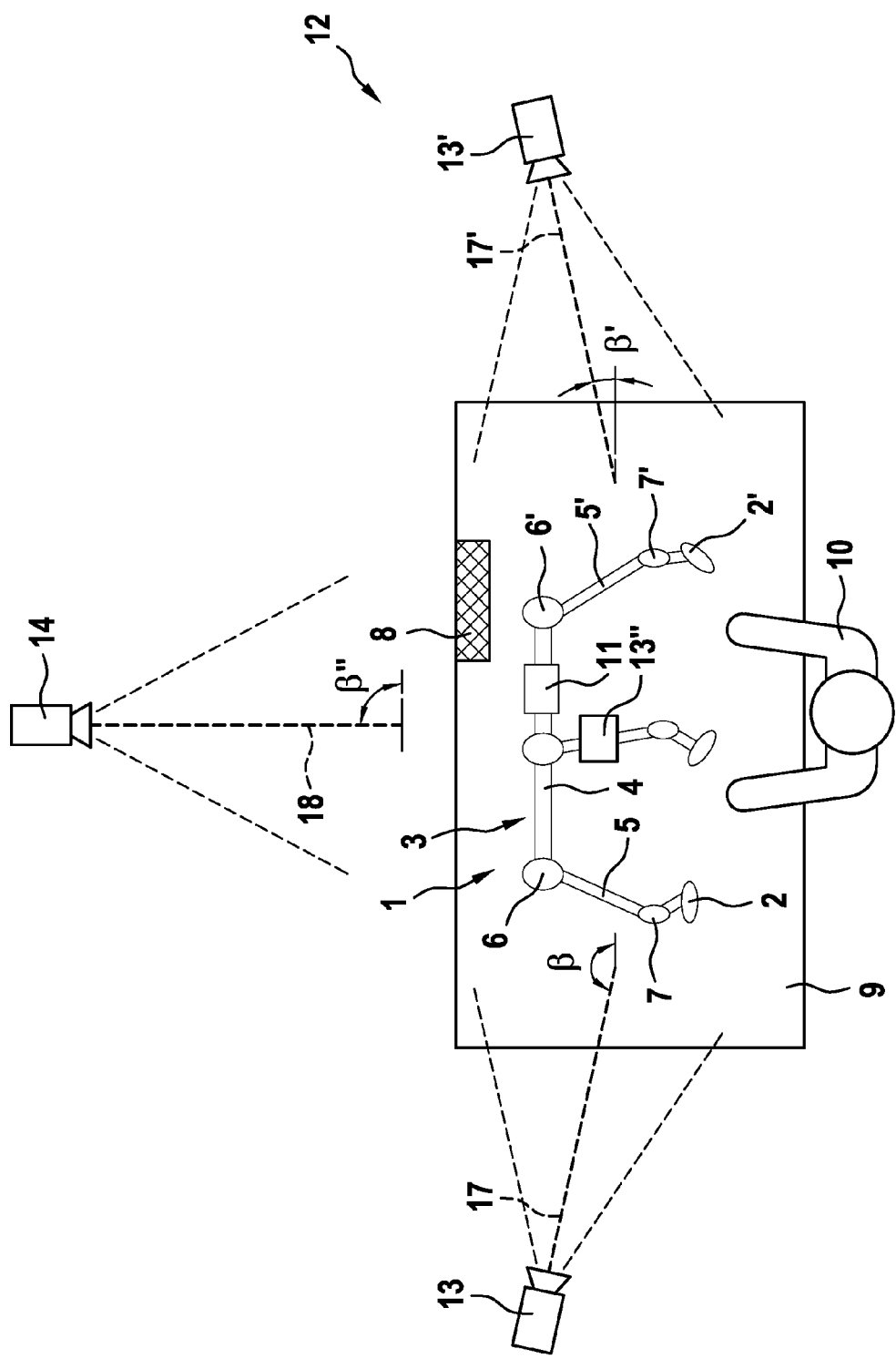
FIG. 3 is a diagrammatic illustration of a workstation as per FIG. 2 in plan view.

It may prove to be advantageous if at least the acquisition means 13, 13', 13'' which perform a position-determining function are arranged and/or oriented such that a holding element 2, 2' that is to be acquired, and/or a support 3 that is to be acquired, and/or a connecting point 5, 5', 6, 6' that is to be acquired, are/is acquired from at least three sides. In other words, the at least three acquisition means 13, 13', 13'' are arranged such that the main acquisition lines 17, 17', 17'' thereof, in the projection thereof onto a projection plane which lies perpendicular to a horizontally oriented assembly table 9 and to which the at least one holding element 2, 2' and/or the support 3 can be fastened by means of a holder 11, enclose an angle $\alpha, \alpha', \alpha''$ in the respective ranges of from 35° to 65°, from 70 to 110° and from 120 to 160°. In particular, an angle $\alpha, \alpha', \alpha''$ in the respective ranges of from 45° to 55°, from 85° to 95° and from 135° to 145° is enclosed. In the plan view (cf. FIG. 3), for the respective main acquisition lines 17, 17', 18 of the acquisition means 13, 13', 14 in the projection of the main acquisition lines 17, 17', 18 onto a projection plane which lies parallel to a horizontally oriented assembly table 9, there may be a resulting angle $\beta, \beta', \beta''$ of from 150° to 190°, from 0° to 20° and from 70 to 110°. It may also be provided that an angle (not illustrated), lying in a projection plane parallel to the main plane of extent of the assembly table or to the worktop of the assembly table, between two adjacent main acquisition lines 17, 17', 18 of two acquisition means 13, 13', 14 lies in the range of from 60° to 100°, in particular in a range of from 70° to 90°, particularly preferably in a range of from 75° to 85°.

The configuration information item displayed by means of the display device 8 preferably comprises at least a comparison of an actual information item, which relates to a relative actual orientation and/or actual position of at least one region of the workpiece-specific holding element 2, 2' with respect to the support 3, with the setpoint information item. Here, a comparison information item which relates to a deviation and/or a correspondence of the comparison is generated. The comparison information item forms at least a constituent part of the configuration information item or is taken into consideration in the latter and is output by means of the display device 8. In other words, a predefined setpoint orientation and setpoint position of a holding element 2, 2' relative to a support 3 is specified as a setpoint information item or as a reference and is discontinuously or continuously compared with actual information items (for example actual orientation and/or actual position), in particular acquired by means of the acquisition device 12, of the holding element 2, 2' relative to the support 3, wherein the result of the comparison is output as a comparison information item, or as at least part of the configuration information item, on the display device 8.

For example, a comparison information item relating to correspondence of the comparison is displayed by means of a first predefined symbol on the display device 8, and/or a comparison information item relating to deviation of the comparison is displayed by means of a second symbol, which differs from the first symbol, on the display device 8, and in particular the first and the second symbol differ in terms of their color and/or shape and/or structure. In the information visually output on the display device 8 in FIG. 4, it can be seen that the contour of the holding element 2, 2', which is likewise displayed on the display device 8, and/or of the connector 6, 6', 7, 7' has been highlighted in a first manner by a marking 19, at least in certain sections, of the boundary line thereof. In the display on the display device 8 shown in FIG. 4, the boundary line of the workpiece holding device 1 is depicted by means of a marking 19 in the form of a dash-dotted line. The dash-dotted line may undergo a change at least in certain sections. As soon as the holding element 2, 2' and/or the connector 5, 5' has, at least in certain regions, reached its intended position and/or orientation, or as soon as the setpoint position and/or setpoint orientation is present at least in certain regions, this may be indicated by means of a change in the marking 19 of the boundary line, displayed on the display device 8, of at least one constituent part of the workpiece holding device 1. The change in the marking 19 or in the boundary line is only one indication possibility. Alternatively or in addition, the surface, and/or, at least in certain sections, the color or structure, of the holding element 2, 2' and/or connector 5, 5' depicted by means of the display device 8, and/or of the connecting points 6, 6', 7, 7', may vary in a manner dependent on the relative actual orientation and/or actual position of holding element 2, 2' and support 3.

The accuracy of the method can be increased by virtue of a calibration step being performed in which at least the deviation of at least one optical acquisition means 13, 13', 13", 14 of the acquisition device 12 to a measurement standard received in the holder 11 or to a measurement standard arranged or formed on the holder 11 is ascertained, and in particular the measurement standard replicates the shape and/or orientation and/or contour of a support 3 held on the holder 11 and/or of a workpiece-specific holding element 2, 2' fastened to the holder 11 and to a support 3. Alternatively or in addition, a marking section, for example in the form of a checkerboard pattern, may be arranged or formed on the assembly table 9, which marking section can be used as a measurement standard for the calibration and thus for the zero adjustment of the acquisition device 12. If a deviation is ascertained during the calibration step, provision may be made for the deviation of at least one optical acquisition means 13, 13', 13", 14 to be taken into consideration in the processing of the information items ascertained from the at least one optical acquisition means 13, 13', 13", 14 and thus in the generation of a configuration information item.

On the display device 8, provision may optionally be made for an additional information item 15, which relates to the workpiece-specific holding element 2, 2', to the support 3 and/or to the workpiece 100 that is to be held during the intended use of the workpiece-specific holding element 2, 2', of the configuration information item to be displayed or shown on the display device 8. The additional information item 15 may for example comprise a component number information item and/or a component weight information item and/or a component dimension information item and/or a manufacturer information item and/or a supplier information item and/or a manufacturing time information item and/or a delivery time information item and/or a tolerance information item and/or an aging information item of the workpiece-specific holding element 2, 2', of the support 3 and/or of the workpiece 100 that is to be held during the intended use of the workpiece-specific holding element 2, 2'.

For example, as shown in FIG. 4, at least one workpiece 100, which during the intended use of the workpiece-specific holding element 2, 2' is to be at least temporarily held by the latter, may be at least partially displayed as an additional information item 15 of the configuration information item on the display device 8. This may be performed for example in the form of a superimposed display of the additional information item 15 on the real image depicted on the display device 8 and/or of the actual information item and/or of the setpoint information item of the at least one workpiece-specific holding element 2, 2'. For example, this is implemented by means of the marking 19 along the boundary lines of the holding element 2, 2' displayed on the screen and/or of the connector 5, 5' and/or of the connecting points 6, 6', 7, 7' and/or of the support 3.

It is possible that the acquisition information item, ascertained by means of an acquisition device 12 and relating to the at least one workpiece-specific holding element 2, 2', is used to derive an additional information item 15. Here, an identification of at least one workpiece-specific holding element 2, 2' and the display of an additional information item 15 associated with this workpiece-specific holding element 2, 2' may be performed by means of the acquisition information item. For example, as an additional information item 15, the component number of the at least one holding element 2, 2' is shown, cf. FIG. 4.

It may prove to be advantageous if a subregion of the support 3 is at least temporarily displayed (not illustrated), in enlarged form in relation to a previous display, on the display device 8, wherein the displayed subregion of the support 3 corresponds to a fastening location of at least one workpiece-specific holding element 2, 2'. For example, the enlargement of at least one subregion of the support 3 on the display device 8 is performed after selection of the workpiece-specific holding element 2, 2' that is to be fastened to the subregion of the support 3. By means of the at least temporary enlarged depiction of a subregion of the support 3, it is made easier for a production worker 10 to visualize assembly-specific details more easily, because these regions are illustrated in enlarged form.

The execution of the selection of at least one workpiece-specific holding element 2, 2' which is to be fastened to the support 3 may be performed for example by optical acquisition of the workpiece-specific holding element 2, 2' by means of an acquisition device 12 and/or by means of manual selection by way of an input device (not illustrated). For example, the holding element 2, 2' is provided with a marking region which allows it to be identified, such that, after acquisition of the marking region by means of the acquisition device 12, an automated selection can be performed, or at least a proposed selection can be offered, which can be confirmed by the production worker 10 by way of an input unit or by an absence of reaction.

The apparatus for executing a method for configuring a workpiece-related workpiece holding device 1 for press automation, comprises a display device 8 and an acquisition device 12 for acquisition of at least one workpiece-specific holding element 2, 2' of the workpiece holding device 1 in order to generate at least one actual information item at least relating to the workpiece-specific holding element 2, 2', which at least one actual information item in particular comprises a relative actual orientation and/or actual position of the at least one workpiece-specific holding element 2, 2' with respect to a support 3, wherein the actual information item is taken into consideration in a configuration information item and can be output on the display device 8. The acquisition device 12 of the apparatus may comprise multiple acquisition means 13, 13', 13", 14 which are arranged or formed so as to be fixable at least in terms of their position and/or orientation relative to an assembly table 9 of the apparatus.

Finally, the concept of the invention relates to a method for feeding a workpiece 100 into an automated press (not illustrated), wherein, for the feed of the workpiece 100, use is made of a workpiece holding device 1 comprising at least one support 3 and at least one workpiece-specific holding element 2, 2', which workpiece holding device has been configured in accordance with a method described herein.

LIST OF REFERENCE DESIGNATIONS

1 Workpiece holding device
2, 2' Holding element
3 Support
4 Elongate tube section
5, 5' Connector
6, 6' Connecting point
7, 7' Connecting point
8 Display device
9 Assembly table
101 Production worker
11 Holder
12 Acquisition device
13, 13', 13" Acquisition means
14 Acquisition means
15 Additional information
17, 17', 17" Main acquisition line
18 Main acquisition line
19 Marking

What is claimed is:

1. A method for configuring a workpiece holding device for press automation, wherein at least one holding element of the workpiece holding device is fastened, in a manner configurable in at least one degree of freedom, to a support of the workpiece holding device, the method comprising:
imaging the at least one holding element via an optical acquisition device, the optical acquisition device arranged in a spatially fixed manner relative to a holder;
depicting a real image of at least one holding element on a display device;
displaying on the display device a configuration information item, which relates to the at least one holding element, the configuration information item comprising at least one intended setpoint information item regarding an intended relative setpoint orientation and/or an intended relative setpoint position of at least one region of the holding element with respect to the support;
generating at least one actual information item relating to the holding element, wherein the at least one actual information item comprises a relative actual orientation and/or relative actual position of the at least one holding element with respect to the support,
displaying on the display device the actual information item with the configuration information item;
displaying on the display device an additional information item, which relates to the holding element, to the support, and/or to the workpiece that is to be held during intended use of the holding element, wherein the additional information item comprises at least one of: a component number, a component weight, a component dimension, a manufacturer, a supplier, a manufacturing time, a delivery time, a tolerance, an aging information; and,
using an acquisition information item, ascertained via an optical acquisition device and relating to the at least one holding element, to derive an additional information item, wherein the additional information item comprises an identification of at least one holding element, and the additional information item is displayed on the display device.

2. The method according to claim 1, further comprising:
comparing the actual information item, which relates to a relative actual orientation and/or actual position of at least one region of the holding element with respect to the support, with the intended setpoint information item; and
generating a comparison information item which relates to a deviation and/or a correspondence of the comparison, wherein the comparison information item is displayed on the display device with the configuration information item.

3. The method according to claim 2, further comprising:
displaying the comparison information item relating to a correspondence of the comparison on the display device, the comparison information item comprising a first predefined symbol and/or a second predefined symbol, which differs from the first symbol, wherein the first and the second symbol differ in terms of color, shape, and/or structure.

4. The method according to claim 1, wherein the real image of the at least one holding element is depicted on at least one transparent region of the display device.

5. The method according to claim 1, wherein the optical acquisition device comprises:
at least two, three, or four optical acquisition devices which optically acquire the holding element from different positions and/or orientations.

6. The method according to claim 5, further comprising:
executing a calibration step in which at least a deviation of at least one optical acquisition device of the acquisition device relative to a measurement standard received in the holder is ascertained, wherein the measurement standard replicates a shape, orientation and/or contour of the support held on the holder and/or of the holding element fastened to the holder and to the support.

7. The method according to claim 6, further comprising:
considering any deviation of at least one optical acquisition device ascertained in the calibration step in processing of the information items ascertained from the at least one optical acquisition device.

8. The method according to claim 1, further comprising:
at least partially displaying at least one workpiece, to be at least temporarily held by the holding element, as an additional information item of the configuration information item on the display device, wherein the additional information item is displayed in a superimposed manner on one or more of the real image depicted on the display device, on the actual information item, and/or on the intended setpoint information item of the at least one holding element.

9. The method according to claim 1, further comprising:
displaying a subregion of the support, in enlarged form in relation to a previous display, on the display device, wherein the displayed subregion of the support corresponds to a fastening location of the at least one holding element, and the enlargement of at least one subregion of the support on the display device is performed after selection of the holding element that is to be fastened to the subregion of the support.

10. The method according to claim 9, further comprising:
executing the selection of the at least one holding element, which is to be fastened to the support, by optical acquisition of the holding element via an optical acquisition device and/or via manual selection by way of an input device.

* * * * *